Aug. 21, 1928.

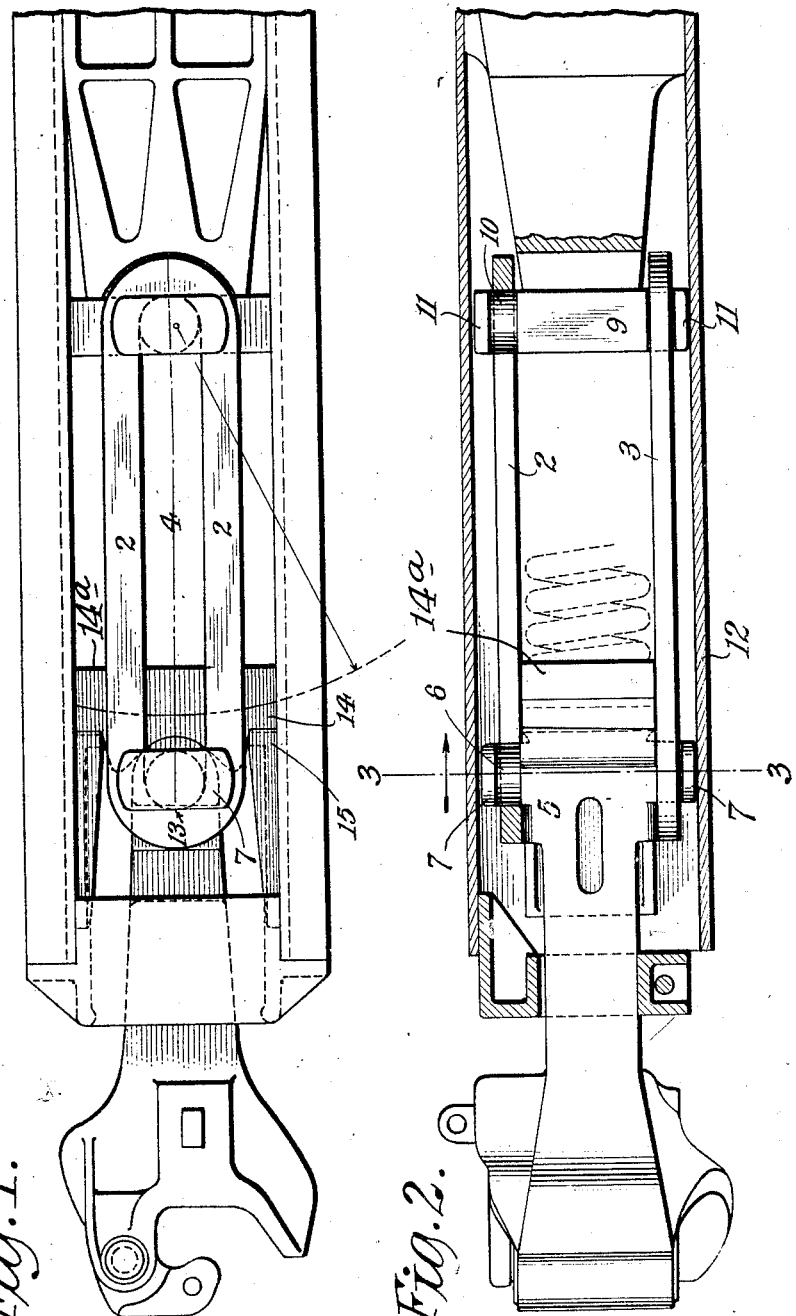

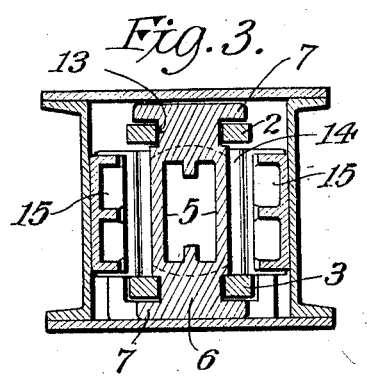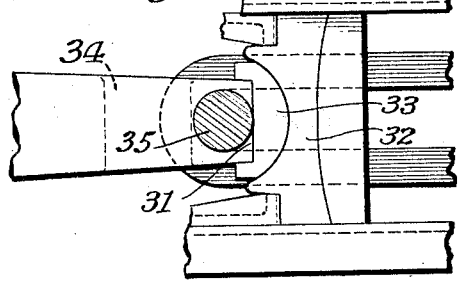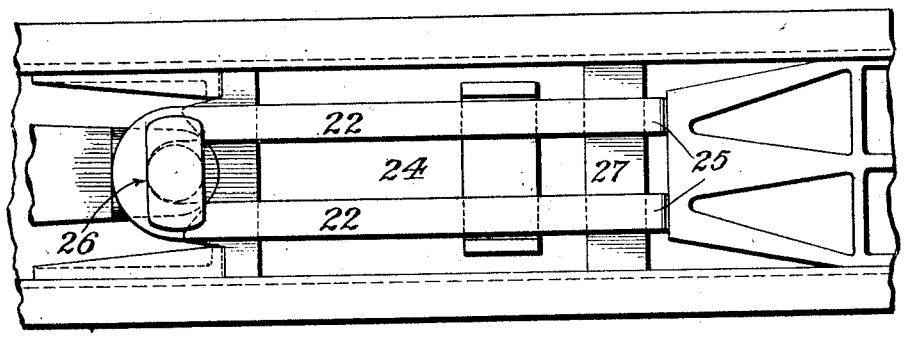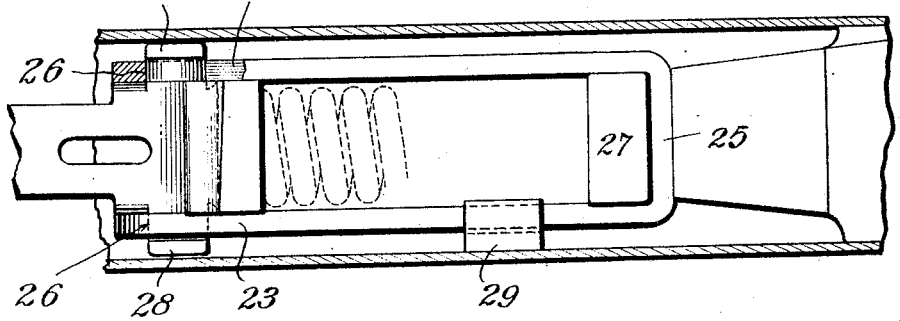

J. A. PILCHER 1,681,781

COUPLER ATTACHMENT

Filed April 18, 1921

3 Sheets-Sheet 3

Inventor
John A. Pilcher
By his Attorney
Clarence D. Kerr

Patented Aug. 21, 1928.

1,681,781

UNITED STATES PATENT OFFICE.

JOHN A. PILCHER, OF ROANOKE, VIRGINIA.

COUPLER ATTACHMENT.

Application filed April 18, 1921. Serial No. 462,082.

Figure 7:
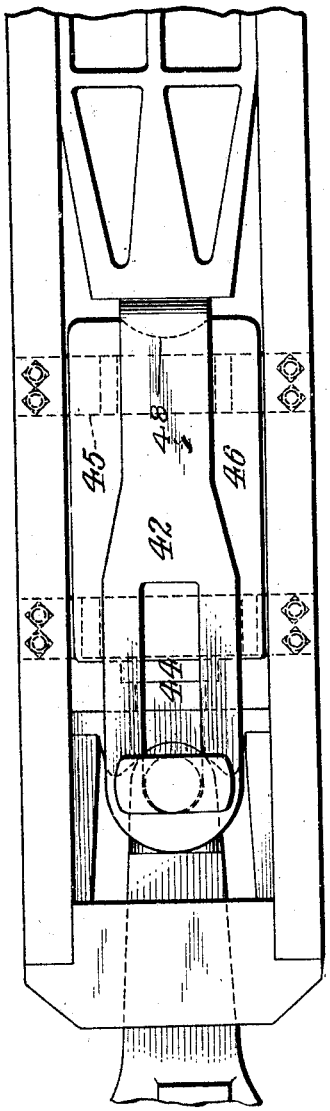
Figure 8:
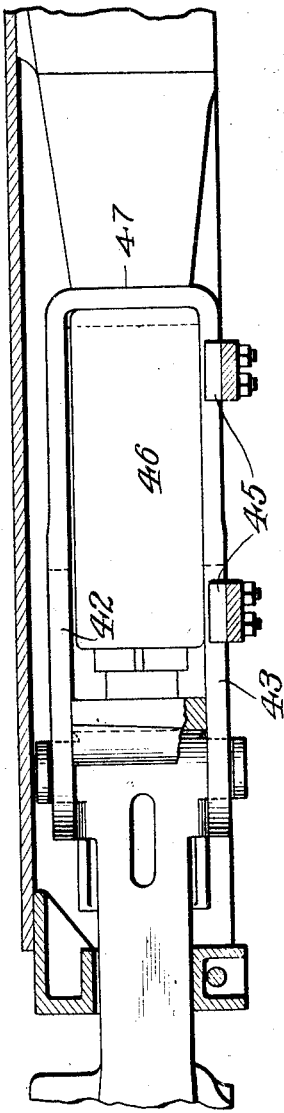

Fig. 1 is a plan showing a coupler and its attachments embodying my invention in position in the underframing of a car; Fig. 2 is a side elevation thereof; Fig. 3 is a section on lines 3—3 of Fig. 2; Fig. 4 is a plan of a modified form of my invention; Fig. 5 is an elevation of the form shown in Fig. 4; Fig. 6 is a section of a modification of my invention; Fig. 7 is a plan of a further modification; and Fig. 8 is an elevation thereof.

My invention relates to coupler attachments, and comprises slotted links in which the coupler is secured to the slotted links by lugs on the coupler butt, which may be inserted into the slots in the links in such manner that relative angular movement of coupler and links will cause the ends of the links and lugs on the coupler to interlock and thereby provide a secure and anti-spreading conection. I also provide substantial pulling bearings between links and coupler, which allows freedom of movement between the parts for lateral angling.

My invention also consists in the cooperation and arrangement of parts which I shall hereinafter describe and claim.

Referring to the drawings, Figures 1, 2 and 3, the coupler attachment is comprised of an upper link 2 and a lower link 3, each of which is preferably made of forged steel and has a vertically disposed slot 4 extending therethrough of substantially the same width from end to end of the link. The coupler butt 5 on its top and bottom surfaces is provided with circular extensions 6, each of which has laterally extending lugs 7 arranged at right angles to the longitudinal axis of the coupler. The rear follower 9, which may be a part of a draft gear case, is equipped with trunnions 10 and laterally extending lugs 11, similar to the trunnions 6 and lugs 7 on the coupler butt. The ends of the slots 4 in the links are arc-shaped and provide bearings 13 for the trunnions 6 and 10 on the coupler butt 5 and follower 9, respectively, to provide substantial pulling bearings between coupler and the links 2 and 3 and between the links 2 and 3 and follower 9, and at the same time allow the coupler freedom for lateral movement. The rear face of the coupler butt 5 and the forward face of the block 14 preferably have corresponding arc-shaped faces to permit the stresses of buffing to be transmitted directly from the coupler to the draft gear, regardless of the particular position to which the coupler may angle laterally with respect to the links. The tangential surface leading away from the arc-shaped forward face on the follower also serves to guide the coupler butt back into position after it has been pulled away from the follower during draft.

The coupler and links are connected before either is placed in the car by placing the coupler and the back follower 9, or the draft gear casing, of which circular extensions 10 may be a part, side by side, with the lugs 7 and 11 lined up, so the links 2 and 3 can be passed over them at the same time. The parts are then turned until the axis of the links coincides with that of the coupler, and the axis of the back follower or draft gear also coincides with the axis of the coupler, thus locking the links to the coupler butt with the lugs 7 upon the trunnions 6, and at the same time locking the links to the back follower 9, or to the draft gear casing that may take its place, about the trunnions 10 by the lugs 11 upon the trunnions.

The block 14 is then put in place, and as its rear face is struck on an arc off-centered from the trunnion 10, which may be on either the follower 9 or directly on the draft gear casing, the draft gear with its front curved surface or follower 14ª may be swung laterally on trunnion 10, at which time the entering edge will be clear of follower 14, but the surfaces will become snug and tight when the draft gear axis coincides with the axis of the links. To assist in the insertion of the draft gear into the pocket between the block 14 and the rear follower 9, the block 14 may be rotated about the arc-shaped rear end of the coupler butt so as to permit the edge of the follower 14ª of the gear to enter upon the rear face of the block 14. Then after it has so entered the gear, the follower 14ª and block 14 may be readily forced snugly into place.

After the draft gear has been placed in position, the coupler, front and rear followers and the links with the draft gear therein are then elevated into position on the car. Beneath the coupler butt and rear follower is a bottom plate 12, detachably fastened to the car frame, which forms a bearing for the lower lugs 7 and 11, supports the coupler butt and links thereby, and also holds the upper lugs 7 and 11 near the top plate.

The rear faces of the forward draft sill stops 15 are tapered slightly, as are the corresponding faces of the block 14, as is shown in dotted lines in Fig. 1, to allow the edges of the follower 14 to enter the space clear of the edges of the stops and thereby permit the easy application of the mechanism to the car after the draft gear has been placed within it. In the form shown in Figs. 1, 2 and 3, the pulling stresses are transmitted directly along the axis of the links to the trunnions 10 on the rear follower, and the links are relieved from the usual lateral bending stresses to which a U-shaped yoke is ordinarily subjected when the pull is out of line with the axis of the yoke.

In Figs. 4 and 5 I have shown a coupler attachment preferably made from a single piece of forged steel in the form of an elongated link with the ends 22 and 23 bent in parallel planes to form the upper and lower arms and joined at their rear ends by the vertically extending portions 25 of the web.

In this embodiment of my invention the slot 24 between the webs extends from the bearing 26 in the upper arm 22 clear around over the rear follower 27 to the bearing 26 at the forward end of the lower arm 23. The coupler is secured to the attachment before application to the car by swinging it at right angles to the attachment and turning it on its side. The coupler butt, when turned on its side, may be slipped between the arms 22 and 23, and then by using the rounded portion of the coupler butt adjoining the trunnion under the lugs 28, be brought back to its normal position, when lugs 28 will pass through the slots 24 in the upper and lower arms and the coupler may then be turned into longitudinal alignment with the attachment. The lugs will then engage the arms in the manner described in connection with Figs. 1, 2 and 3. The rear follower 27 employed in this embodiment may be of the usual type, and the attachment may be supported near its rear end by a bearing plate 29. In order to easily insert the close-fitting draft gear between the back follower and front follower, the front follower is turned to one side from its normal position, thus opening one side into which when the draft gear is pushed, the front follower can be pushed back into normal place with it, making a snug fit.

In Fig. 6 I have shown a modification of my invention applied to a coupler butt having a rear portion 31 of the usual standard straight-faced type. Between the block 32 and the rear face of the coupler I have placed an inserted member 33 taking about the rear face and the rear portion of the sides of the coupler butt. The rear face of the member 33 is arc-shaped to correspond to the forward face of the block 32, so as to permit angling of the coupler with reference to the attachment. A coupler butt so constructed may be attached to a key yoke through the slot 34 or to an attachment such as I have described herein by the trunnions 35.

In Figs. 7 and 8 I have shown a further modification of my invention in which a cast attachment is employed, in which the arms 42 and 43 are slotted at 44 to permit the insertion of the lugs on the coupler butt. The coupler and attachment are connected together in the manner hereinbefore described with reference to Figs. 4 and 5, and the attachment is supported by the bearing plates 45. I have indicated a friction draft gear case 46 in position in the attachment. The vertically extending portion of the attachment 47 is preferably made with a cylindrical forward face 48 bearing against a corresponding cylindrical surface, in either the rear follower or the rear end of the draft gear casing, in such manner as to allow the lateral movement of the forward end of the attachment without lateral bending stresses. The draft gear may be inserted by rotating the front follower about the coupler butt to allow the rear of the draft gear to be placed against the vertical portion of the attachment and then forcing the follower and draft gear into normal position, placing the draft gear under slight compression.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is:

1. A coupler attachment comprising slotted upper and lower links, a coupler having lugs on the top and bottom surfaces of the butt of greater lateral extent than the width of the slots in the links, said lugs being insertable and removable through said slots when arranged at right angles to their normal position, corresponding arc-shaped pulling surfaces on coupler and links permitting, when the links and coupler have been locked together, lateral angling of the coupler relative to the links.

2. A coupler attachment comprising slotted upper and lower links, arc-shaped bearings at the forward ends of the slots in said links, a coupler, arc-shaped bearings on the top and bottom of the coupler butt engaging the arc-shaped bearings in the links and permitting lateral angling of the coupler relative to the links, lugs on the coupler butt extending through said slots in the links, one of said lugs overlying a portion of the upper link and another of said lugs underlying a portion of the lower link when the coupler and links are in operative position, the coupler being removable from between said links only when substantially at right angles thereto.

3. A coupler attachment comprising upper and lower links with vertically extending slots therethrough, a coupler, projections on the top and bottom of the coupler bearing against the forward ends of said slots and having a rotative engagement therewith for lateral angling; lugs on the projections having their long axis at right angles to the axis of the coupler engaging, respectively, the upper face of the upper link and the lower face of the lower link, the coupler and links being disengageable by rotation of one relative to the other to bring the lugs into position to permit their passage through said slots.

4. A coupler attachment comprising upper and lower links with vertically extending slots therethrough, a coupler, projections on the top and bottom of the coupler bearing against the forward ends of said slots and having a rotative engagement therewith for lateral angling, a rear follower block connecting the links and having a bearing in the slot of each link, a front follower block, the rear face of which conforms to an arc struck off-center from the vertical axis of the rear follower to permit the easy insertion of the draft gear between the links.

5. A coupler attachment comprising upper and lower links with vertically extending slots therethrough, a coupler, projections on the top and bottom of the coupler bearing against the forward ends of said slots and having a rotative engagement therewith for lateral angling, a follower connecting the links having a bearing in the slot in each link, and means on the follower for holding the links in operative relation to a draft gear.

6. In a device of the character described, a coupler attachment comprising upper and lower links, a coupler the butt thereof having a slot and projection engagement with the forward ends of the links and also having an arc-shaped rear face, a follower having an arc-shaped forward face cooperating with the rear face of the coupler butt, the follower being capable of rotation about said coupler butt to permit the easy insertion of a draft gear between the links.

7. In a device of the character described, a coupler attachment comprising a pair of links, a coupler, a rear follower, trunnions on the coupler butt and on the rear follower engaging said links and permitting, respectively, rotary movement between follower and links and coupler butt and links, and means for holding the links on said trunnions.

8. In a device of the character described, a coupler attachment comprising slotted upper and lower links, a coupler, trunnions on the top and bottom faces of the coupler butt projecting through the slots in the links, plates above the upper and below the lower links, the plate below engaging the bottom trunnion supporting coupler and links and holding the top trunnion near the top plate, thereby limiting the vertical movement of coupler butt and links.

9. In a device of the character described, a coupler attachment comprising upper and lower links, a coupler, the butt thereof having a slot and projection engagement with the forward ends of the links, a draft gear having a front follower, forward draft sill stops to cooperate with the front follower, said stops and follower having their cooperating faces tapered to allow the easy entrance of the upper portions of the follower and draft gear into its position on a car.

10. A coupler rotatively connected with an upper and lower link, the butt of the coupler having a rear cylindrical surface, a draft gear, the upper and lower links rotatively fastened behind the draft gear, a follower back of the cylindrical rear surface of the butt of the coupler, having a cylindrical surface for receiving the coupler with tangential extensions therefrom, permitting the ready rotation of the follower around the butt of the coupler, in order to give clearance for the direct entering of the draft gear in place.

11. A coupler attachment comprising upper and lower members with vertically extending slots therethrough, a coupler having a flexible pulling engagement at the forward ends of said members in said slots, a connection between the rear ends of said members and having a rotatable engagement therewith, a front follower bearing against the rear end of the coupler, and draft sill stops so disposed as to be engaged by the follower and to present no interference to the members during lateral movement thereof.

12. A coupler attachment comprising upper and lower members with vertically extending slots therethrough, a coupler, projections on the top and bottom of the coupler bearing against the forward ends of said slots and having a rotative engagement therewith, a pair of followers, draft sill stops engaging said followers, the coupler under buff being capable of moving rearwardly relative to said members, and the members also under buff being capable of movement rearward relative to said stops.

13. A coupler attachment comprising slotted upper and lower links, a coupler and a cushioning mechanism, each having lugs on the top and bottom surfaces of greater lateral extent than the width of the slots in the links, said lugs being insertable and removable through said slots when arranged at right angles to their normal position, corresponding arc-shaped pulling surfaces on the coupler and links and on the links and cushioning mechanism, permitting when the coupler, the links and the cushioning mechanism have been locked together, lateral angling of the coupler relative to the links and lateral angling of the links relative to the cushioning mechanism.

14. A coupler attachment comprising slotted upper and lower links, arc-shaped bearings at the ends of said links, a coupler having arc-shaped bearings on the top and bottom of the butt thereof engaging the arc-shaped bearings in the forward ends of the links and permitting lateral angling of the coupler relative to the links, a cushioning mechanism having arc-shaped bearings on the top and bottom thereof engaging the arc-shaped bearings in the backward ends of the links and permitting lateral angling of the links relative to said cushioning mechanism, lugs on the top of the coupler butt and the cushioning mechanism extending through the slot and overlying the upper link and lugs on the bottom of the coupler butt and the cushioning mechanism extending through the slot and underlying the lower link, the coupler and cushioning mechanism being removable from between said links only when substantially at right angles thereto.

15. A coupler attachment comprising upper and lower links with vertically extending slots therethrough, a coupler having projections on the top and bottom of the butt bearing against the forward ends of said slots and having a rotative engagement therewith for lateral angling, a cushioning mechanism having projections on the top and bottom thereof bearing against the backward ends of said slots and having a rotative engagement therewith for lateral angling, lugs on the projections of both the coupler and the cushioning mechanism having their long axis at right angles to the axis of the coupler and cushioning mechanism engaging, respectively, the upper face of the upper link and the lower face of the lower link, the coupler and the cushioning mechanism being disengageable from said links by rotation of coupler and cushioning mechanism relative to said links to bring the lugs into position to permit their passage through said slots.

16. In a device of the character described, a coupler attachment comprising a pair of links, a coupler and a cushioning mechanism, trunnions on the coupler butt and cushioning mechaism engaging said links and permitting respectively, rotary movement, between the coupler and links and between the links and cushioning mechanism and means for holding the links on said trunnions.

17. In a device of the character described, a coupler attachment comprising slotted upper and lower links, a coupler and a cushioning mechanism each having trunnions on the top and bottom surfaces thereof engaging said upper and lower links, plates above the upper and below the lower link, the plate below engaging the bottom trunnions, supporting the coupler and cushioning mechanism and holding the top trunnions near the upper plate thereby limiting the vertical movement of the coupler and cushioning mechanism.

18. A coupler attachment comprising upper and lower links with vertically extending slots therethrough, a coupler and a cushioning mechanism, projections on the top and bottom of the coupler bearing against the forward ends of said slots, projections on the top and bottom of the cushioning mechanism bearing against the backward ends of said slots and having a rotative engagement therewith to permit the lateral angling of the yoke on the cushioning mechanism.

19. In an attachment for a coupler and a cushioning mechanism, the coupler and cushioning mechanism being rotatively connected to the attachment, a follower back of the coupler with an arc-shaped recess for receiving the coupler butt and tangential surfaces extending from the arc-shaped recess to guide the coupler butt to normal position after the compression of the cushioning mechanism from pulling strains abates.

20. A coupler attachment comprising slotted upper and lower members, a coupler having a pulling connection in slots in the forward ends of said members, and a connecting member between the rear ends of said members having a rotatable engagement therewith and providing rotary and longitudinal movement between said coupler and said connecting member.

21. In a draft rigging, the combination with the draft sills having spaced stop members connected thereto, of a coupler, a cushioning mechanism therefor, and means for operatively connecting said coupler and cushioning mechanism, said means comprising a pair of independent, spaced horizontal members respectively disposed for their entire length above and below said stop members.

22. In a draft rigging, the combination with a coupler, of a cushioning mechanism therefor, and means for connecting the same, said means including a pair of horizontally disposed closed loop members, each of said members having adjacent one end a curved bearing surface; said surfaces being adapted to normally engage correspondingly shaped projections integral with the said coupler.

23. In a device of the character described, a coupler attachment comprising upper and lower links, a coupler the butt thereof having a slot and projection engagement with the forward ends of the links and also having an arc-shaped rear face, a cushioning mechanism having a slot and projection engagement with the backward ends of the links, a follower having an arc-shaped forward face cooperating with the rear face of the coupler butt, the follower being capable of rotation about said coupler butt to permit the easy insertion of the cushioning mechanism between said links.

JOHN A. PILCHER.